US012811915B2

(12) United States Patent
Boucadair et al.

(10) Patent No.: US 12,811,915 B2
(45) Date of Patent: Nov. 24, 2026

(54) METHOD FOR PROCESSING AT LEAST ONE DATA PACKET, AND ASSOCIATED DEVICE AND SYSTEM

(71) Applicant: ORANGE, Issy les Moulineaux (FR)

(72) Inventors: Mohamed Boucadair, Chatillon (FR); Christian Jacquenet, Chatillon (FR)

(73) Assignee: ORANGE, Issy les Moulineaux (FR)

( * ) Notice: Subject to any disclaimer, the term of this patent is extended or adjusted under 35 U.S.C. 154(b) by 144 days.

(21) Appl. No.: 18/708,813

(22) PCT Filed: Nov. 8, 2022

(86) PCT No.: PCT/EP2022/081045
§ 371 (c)(1),
(2) Date: Jul. 31, 2024

(87) PCT Pub. No.: WO2023/083769
PCT Pub. Date: May 19, 2023

(65) Prior Publication Data
US 2024/0422133 A1 Dec. 19, 2024

(30) Foreign Application Priority Data
Nov. 10, 2021 (FR) .................................... 2111978

(51) Int. Cl.
*H04L 9/40* (2022.01)

(52) U.S. Cl.
CPC .......... *H04L 63/04* (2013.01); *H04L 63/0227* (2013.01)

(58) Field of Classification Search
USPC .......................................................... 726/1
See application file for complete search history.

(56) References Cited

U.S. PATENT DOCUMENTS 8,856,869 B1 10/2014 Brinskelle
10,320,813 B1 * 6/2019 Ahmed .............. H04L 63/1416
2016/0191545 A1 6/2016 Nanda et al.

OTHER PUBLICATIONS

English translation of the Written Opinion of the International Searching Authority dated Jan. 23, 2023 for corresponding International Application No. PCT/EP2022/081045, filed Nov. 8, 2022.

(Continued)

*Primary Examiner* — Sakinah White-Taylor
(74) *Attorney, Agent, or Firm* — David D. Brush; Westman, Champlin & Koehler, P.A.

(57) ABSTRACT

A method for processing at least one data packet generated by at least one terminal connected to a network, where items of identification information relating to the identity and/or environment of an entity to which the at least one terminal belongs are able to be predetermined based on sensitive data having been inserted into the at least one packet before it reaches the destination equipment item. The method is implemented by at least one modifying device, each modifying device executing a set of steps of: obtaining at least one control rule of the broadcasting of at least one predetermined sensitive datum, and, if the at least one sensitive datum is detected in the at least one data packet, applying the at least one control rule to the at least one data packet.

23 Claims, 3 Drawing Sheets

(56) References Cited

OTHER PUBLICATIONS

Anastasia Shuba et al., “AntShield: On-Device Detection of Personal Information Exposure,” arxiv.org, Cornell University Library, 201 Olin Library Cornell University Ithaca, NY 14853, Mar. 4, 2018 (Mar. 4, 2018), XP080857567.

Shuba Anastasia Ashuba@Uci Edu et al., “AntMonitor Network Traffic Monitoring and Real-Time Prevention of Privacy Leaks in Mobile Devices,” User Interface Software and Technology, ACM, 2 Penn Plaza, Suite 701 New York NY 10121-0701 USA, Sep. 11, 2015 (Sep. 11, 2015), p. 25-27, XP058523527.

Anastasia Shuba et al., “AntMonitor: System and Applications,” arxiv.org, Cornell University Library, 201 Olin Library Cornell University Ithaca, NY 14853, Nov. 14, 2016 (Nov. 14, 2016), XP080731493.

Cooper A. et al., “Privacy Considerations for Internet Protocols,” Internet Architecture Board (IAB), Request for Comments: 6973, ISSN: 2070-1721, Jul. 2013.

International Search Report dated Jan. 23, 2023 for corresponding International Application No. PCT/EP2022/081045, filed Nov. 8, 2022.

Written Opinion of the International Searching Authority dated Jan. 23, 2023 for corresponding International Application No. PCT/EP2022/081045, filed Nov. 8, 2022.

* cited by examiner

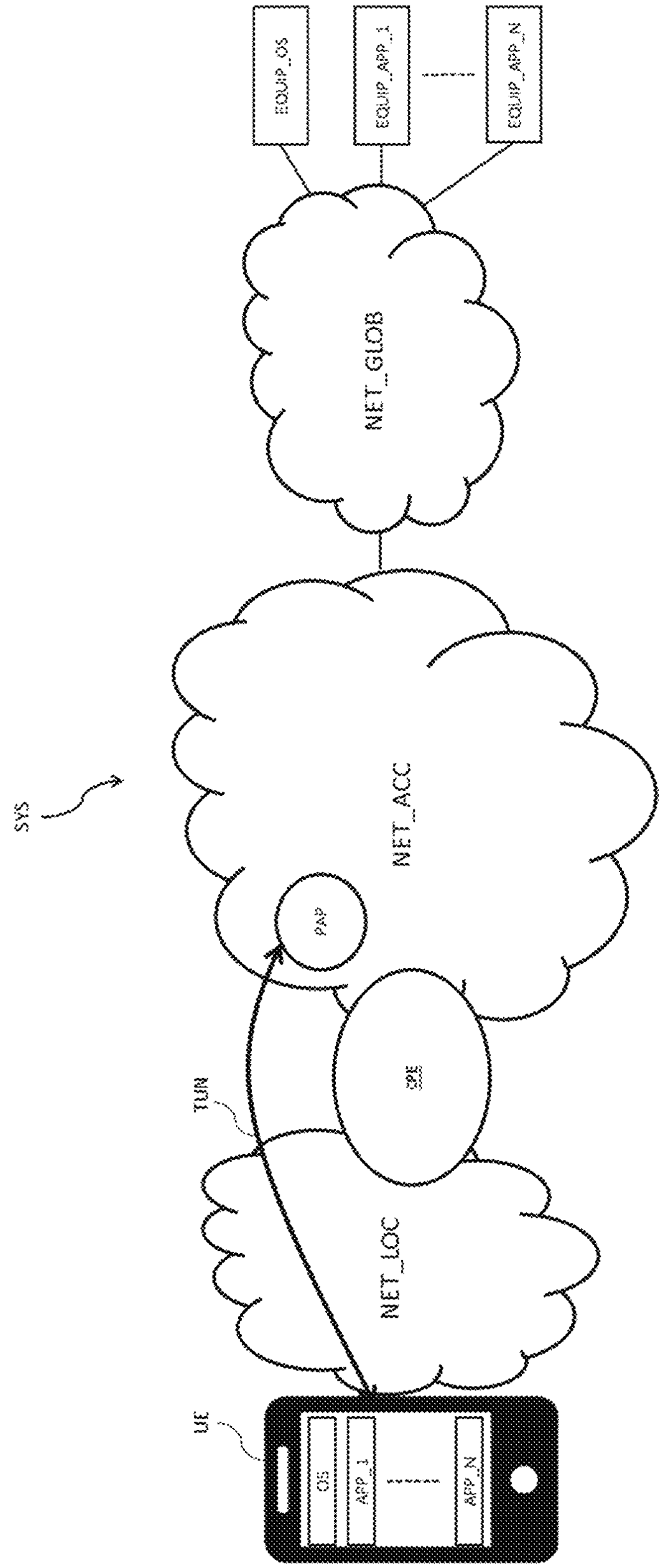
[Fig. 1]

[Fig. 2]
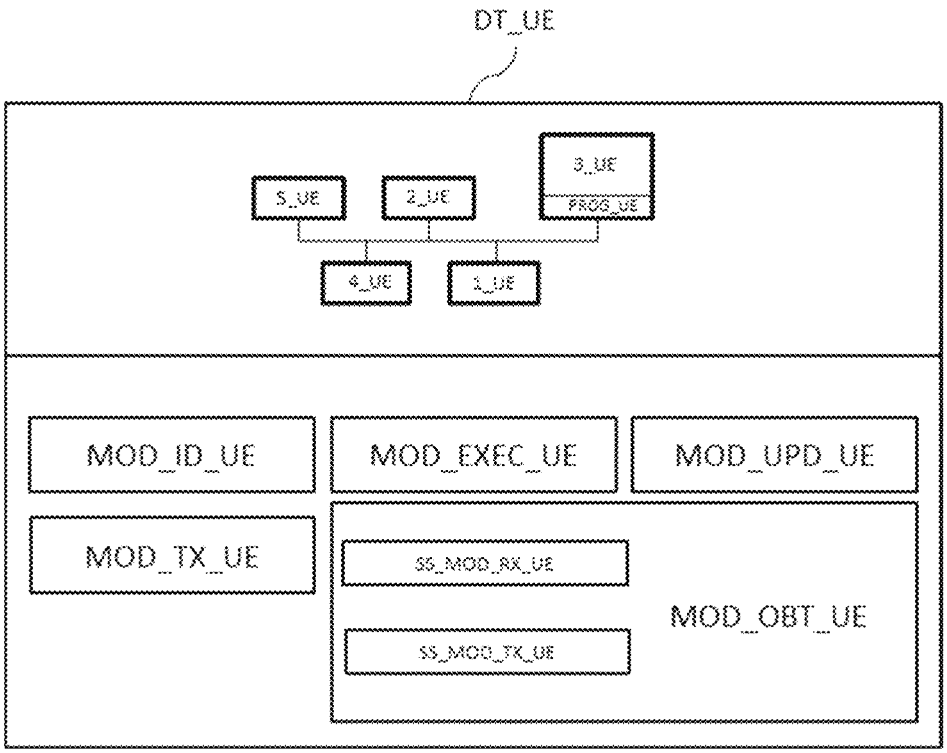
[Fig. 3]
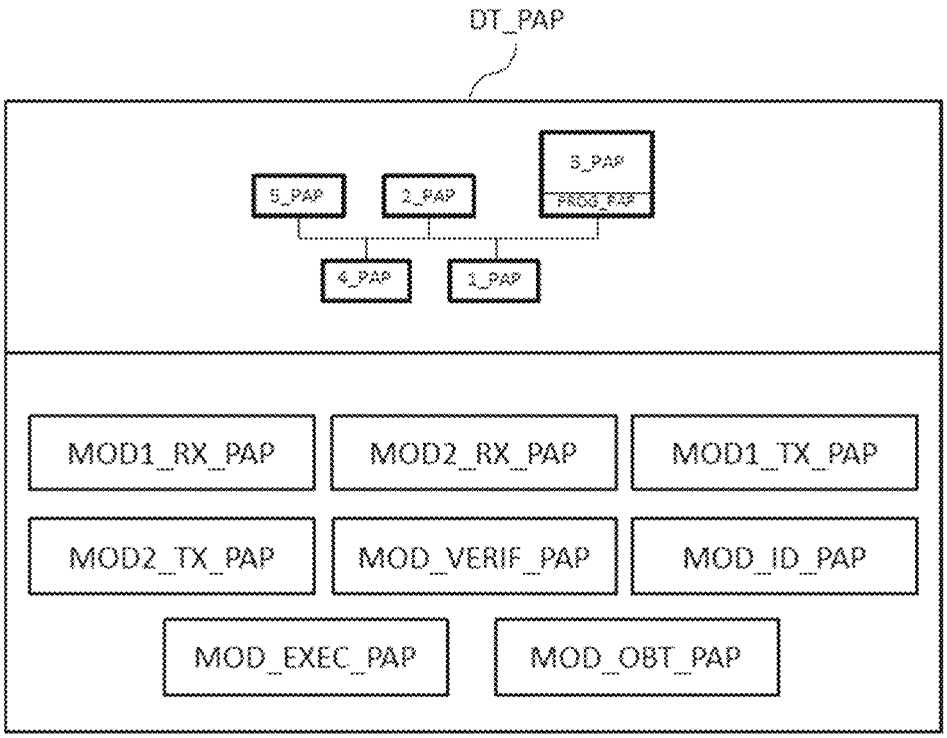

[Fig. 4]
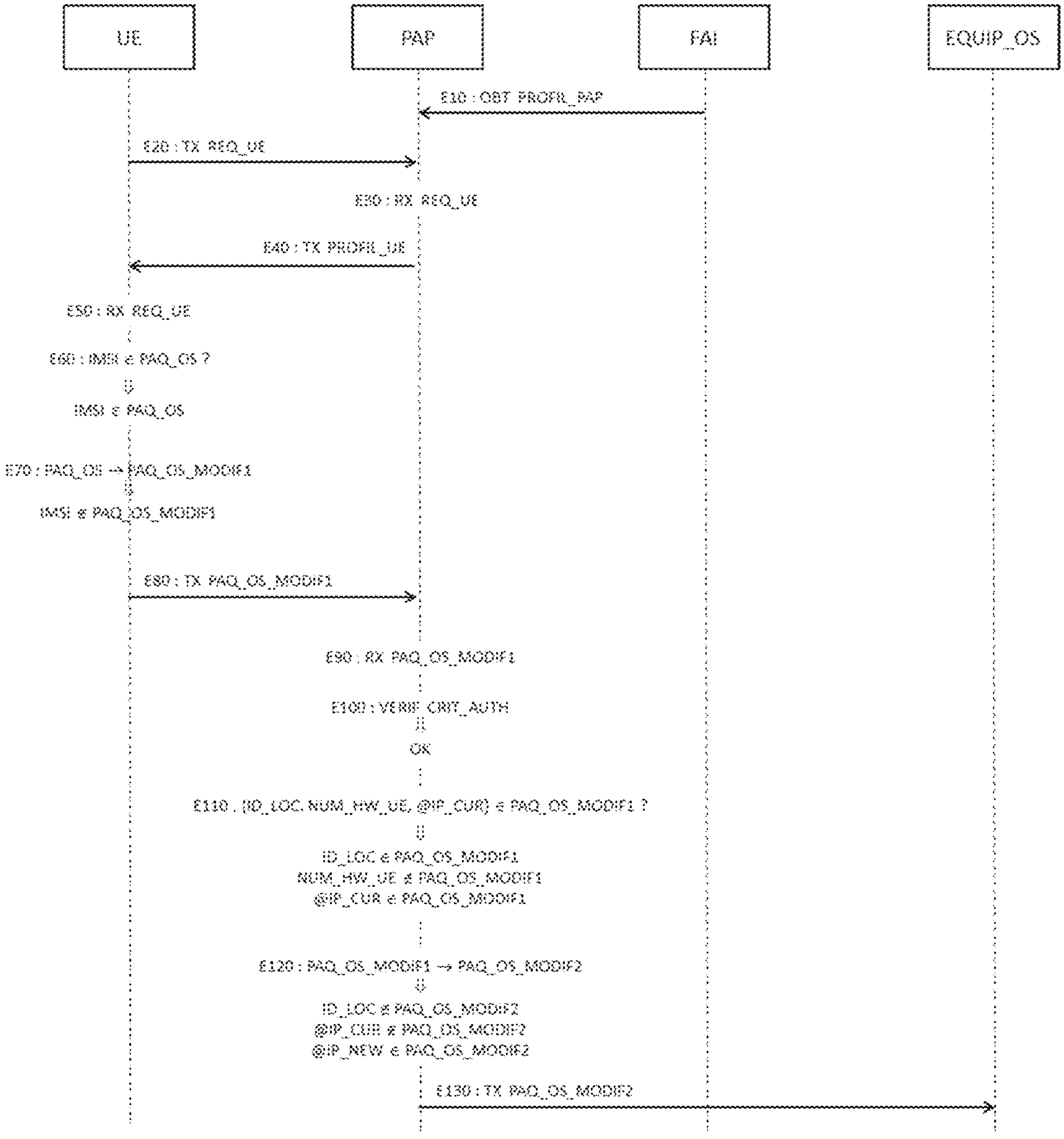

METHOD FOR PROCESSING AT LEAST ONE DATA PACKET, AND ASSOCIATED DEVICE AND SYSTEM

CROSS-REFERENCE TO RELATED APPLICATIONS

This Application is a Section 371 National Stage Application of International Application No. PCT/EP2022/081045, filed Nov. 8, 2022, the content of which is incorporated herein by reference in its entirety, and published as WO 2023/083769 on May 19, 2023, not in English.

PRIOR ART

This invention belongs to the general field of telecommunications. It more specifically relates to a method for processing at least one data packet generated by at least one terminal connected to a network. It also relates to a device configured to implement said modifying method, along with a system including a plurality of such devices. The invention has a specifically advantageous, though in no way limiting application, in a context where a user of a terminal wishes to control the nature of the information that its terminal is able to supply to one or more equipment items accessible via a network such as the Internet network or an Intranet network.

The constant development of information technologies, along with the ever-increasing adoption and use by users, contribute to the transmission of a considerable amount of data over the communication networks making use of these technologies.

The transmission of these data is conventionally based on the exchange of data packets emitted by terminals in possession of the users. These can of course be data whose user knows they will be transmitted, for example when a telephone call is made by means of a mobile phone.

However, this can also relate to data inserted into packets by a software program equipping a terminal in the possession of a user and transmitted, from the terminal to a remote equipment item (server, software instance, etc.), without said user knowing. In particular, it is known that the operating system or systems equipping the terminal of a user, along with the software applications installed on this terminal, can transmit data without said user knowing to remote equipment items, such as for example servers accessible via a network (e.g. the Internet network), data which are managed by the manufacturer/designer of said operating system/ of said or application or applications.

By way of example without any limitation, data transmitted without a user knowing by the operating system of a user's mobile phone may be any item from among:

- an IMEI (International Mobile Equipment Identity) number,
- a serial number of the mobile phone,
- a serial number of the SIM card inserted into the mobile phone,
- a phone number,
- a local IP address,
- a MAC (Media Access Control) hardware address of said mobile phone, or optionally one or more MAC hardware addresses of terminals located in the neighborhood of the mobile phone (for example, following the automatic execution by the mobile phone of a procedure of discovery of MAC hardware addresses for the purpose of a possible association (pairing)), etc.

It can moreover be noted that such data are liable to be transmitted without the user knowing even though no SIM card is activated by the mobile terminal.

Data thus transmitted without the user knowing can be the subject of systematic collection by the remote equipment items in question (and thus be described as "telemetry data"), to be ultimately used in the implementation of different types of processing.

Such processing can for example consist in the analysis of an activity of the source (operating system, software application, as mentioned above) from which the data transmission originated, thus legitimately making a contribution to improving the operation of said source, for example via the development and provision of updates or corrections (patches) that the user can install on its terminal.

This being so, even taking into account the hypothesis of an entirely honorable intention on the part of a manufacturer/designer of an operating system/of a software application (e.g. a software improvement as described above), the transmission of data without a user knowing nonetheless remains problematic insofar as it contributes to the risk of information relating to the identity of said user being predetermined using the transmitted data. Such items of information are items of "identification information" as defined by the IETF (Internet Engineering Task Force) in the document RFC 6973 of July 2013.

It should be noted that the fact of being able to obtain such items of identification information from transmitted data makes it possible to classify these data as "sensitive data".

This determination of items of identification information can typically be done by correlating or by combining with one another a number of sensitive data transmitted by different sources (operating system, software application etc.) and/or by correlating or by combining sensitive data of different types transmitted by one and the same source and/or again by correlating or by combining sensitive data transmitted by one or more sources with data transmitted by other software means, such as for example GPS (Global Positioning System) location data, etc.

Furthermore, said items of identification information are not necessarily limited to the identity of the user of the terminal from which the transmission of sensitive data originated, but can also relate more generally to the environment of said user, such as for example other users whose respective terminals are located in the neighborhood of the emitter terminal.

It should be noted that the concept of "neighborhood" here refers to terminals located near a given terminal and the presence of which can be discovered, for example, using broadcast mechanisms implemented by said given terminal with a view to a possible association (pairing), the keeping of an ARP (Address Resolution Protocol) table or ND (Neighbor Discovery) table.

By way of example, if sensitive data transmitted by a first terminal discloses MAC hardware addresses (or any other persistent identifier) of other terminals located in the neighborhood of said first terminal, it is possible to access (conditional on the implementation of suitable correlations with other data) items of identification information relating to the users of these other terminals, such as for example items of information relating to social acquaintances, centers of interest, places visited etc. What is more, these items of identification information can be predetermined even though these other terminals support an operating system separate from that supported by the first terminal transmitting said sensitive data.

Finally, the transmission of sensitive data without the users of terminals knowing represents a threat to their privacy, especially since developments in the complexity of operating systems, along with the large increase in software applications, are tending to increase still further the volume of these sensitive data transmitted over communications networks.

SUMMARY OF THE INVENTION

The subject of this invention is to remedy all or part of the drawbacks of the prior art, particularly those described above, by making provision for a solution that makes it possible to control the broadcasting of sensitive data transmitted by at least one terminal (typically without it knowing). In other words, the solution for which the invention makes provision offers the possibility of limiting the exposure of items of identification information of an entity to which said at least one terminal belongs, which consequently contributes to limiting the possibilities of unambiguous identification of this entity.

Within the meaning of this invention, an entity can refer to a user or an administrator of said at least one terminal. The concept of administrator typically refers to a person (physical or legal) in charge of the management of said at least one terminal. By way of example without any limitation, this can be a parent responsible for managing a plurality of mobile phones respectively used by his children, or else a company responsible for managing a plurality of terminals deployed in the premises it occupies and used by employees.

It will therefore be understood that when the term "entity" refers to a physical person, the limitation of the exposure of items of identification information to this person advantageously equates to improving the preservation of the privacy of this latter.

The concept of "entity" is not, however, limited to the preceding cases, and also relates, in the context of this invention, to cases where the entity in question refers to:

- an access network to which said at least one terminal is connected, and connected to the network via which said destination equipment item is accessible, or
- a local network to which said at least one terminal is connected, and connected to said access network.

The inclusion of these other cases of application stems in particular from the fact that a network (i.e. one or more equipment items belonging to said network) is able to insert data into packets emitted by at least one terminal.

To make it possible to control the broadcasting of items of identification information, the invention relates, in a first aspect, to a method for processing at least one data packet generated by at least one terminal connected to a network, said at least one data packet being addressed to a so-called "destination" equipment item accessible via said network, items of identification information relating to the identity and/or environment of an entity to which said at least one terminal belongs being able to be predetermined based on so-called sensitive data having been inserted into said at least one packet before it reaches the destination equipment item. Said method is implemented by at least one processing device separate from said destination equipment item, each processing device executing a set of steps comprising:

- the obtaining of at least one rule of control of the broadcasting of at least one predetermined sensitive datum,
- and, if said at least one sensitive datum is detected in said at least one data packet, the applying of said at least one control rule to said at least one data packet.

Thus, the processing method according to the invention makes provision for making a detection of at least one sensitive datum in at least one data packet generated by at least one terminal, this detection being made by a device which differs from the destination equipment item to which said at least one data packet is initially addressed. In this way, the detection of sensitive data can for example be done before said at least one packet even reaches its destination.

By proceeding in this way, the invention makes it possible to determine whether or not sensitive data have been inserted by one or more sources (e.g. operating system of a terminal, software application installed on a terminal, access network or where applicable local network) into said at least one data packet, particularly without the user of said at least one terminal knowing.

Note that the concept of "insertion" of sensitive data into a data packets covers, within the meaning of this invention, two cases, namely:

- a first case in which sensitive data are contained in a data packet as soon as it is emitted by said at least one terminal. By way of example, such a packet can be emitted by an operating system or a software application installed on said at least one terminal;
- a second case in which a data packet originally transmitted by said at least one terminal is modified, during its routing toward said destination equipment item, by a (source) entity other than said at least one terminal, so as to incorporate sensitive data into it.

This detection of sensitive data in at least one data packet is more particularly implemented based on rules, so-called "control rules", configured to denote the sensitive datum or data to be identified in said at least one data packet as well as to supply processing instructions (e.g. deletion, replacement, moving etc.) of the data thus denoted.

The invention thus makes it possible to modify (where applicable, i.e. if the detection is positive, i.e. at least one sensitive datum is detected) the contents of packets emitted toward destination equipment items, which proves particularly advantageous for limiting the exposure of items of identification information of the entity to which said at least one terminal belongs. This way of proceeding thus contributes to limiting the possibilities of unambiguous identification of this entity. More specifically, when this entity is an individual, the processing method according to the invention advantageously makes it possible to improve the preservation of this individual's privacy.

Note that the processing method according to the invention can be part of a service offered by a service provider in charge of managing one or more separate processing devices of said at least one terminal, such as for example the access provider responsible for the management and maintenance of the network via which said destination equipment item is accessible.

In particular modes of implementation, the processing method can further include one or more of the following features, taken in isolation or in any technically possible combination.

In particular modes of implementation, a processing device is incorporated into said at least one terminal, the obtaining step executed by said processing device including the receiving of said at least one control rule, the set of steps executed by said processing device further including a step of emitting said at least one packet implemented after the applying step if said at least one sensitive datum is detected in said at least one data packet.

According to these dispositions, it is possible to implement the modifying method according to the invention at the level of a terminal from which the emitting of a packet including sensitive data originated, i.e. upstream of the transmission chain of said packet before it reaches its final destination.

In particular modes of implementation, the obtaining step executed by the processing device incorporated into said at least one terminal further includes the emitting of a request to obtain said at least one control rule, said at least one control rule being received by said at least one terminal in response to said obtainment request.

It will be understood that in such modes, said at least one terminal itself seeks the obtainment of the control rule or rules that it is brought to then apply to data packets.

In a variant, the control rule or rules can be received by the terminal without being asked, i.e. without the latter originating an explicit request to obtain this control rule or rules.

In particular modes of implementation, the set of steps executed by the processing device incorporated into said at least one terminal further includes a step of updating said at least one obtained control rule.

Such dispositions are advantageous in that they allow the entity to which said at least one terminal belongs to update said at least one obtained control rule. Such an update is for example made by the user of said at least one terminal, for example by means of an interface (screen, keyboard, etc.) of said at least one terminal. Alternatively, the entity can inform the access provider that it wishes for the latter to update said at least one control rule then transmit it to a dedicated equipment item (for example an intermediate device according to the invention and described hereinafter). Said a dedicated equipment item can then relay said at least one updated control rule updated to said at least one terminal, for example in response to an obtainment request, or spontaneously without any particular asking by the terminal.

The updating of said at least one control rule can consist, for example, in the deletion of one or more control rules and/or in the replacement of one or more control rules with one or more other control rules.

Alternatively, or else additionally, the updating of said at least one control rule may consist, for example, in adding one or more control rules, so as to limit still further the exposure of items of identification information relating to said entity.

In particular embodiments, a processing device is incorporated into at least one device separate from said at least one terminal and referred to as an "intermediate device", said set of steps executed by said processing device further including:

- the receiving of said at least one data packet,
- an emission, consisting in relaying said at least one data packet to the destination equipment item, said emission being implemented after the applying step if said at least one sensitive datum is detected in said at least one data packet.

Such provisions allow the intermediate device to act as a proxy between said at least one terminal and the destination equipment item to which a data packet is addressed. In other words, the intermediate device here possesses routing information needed to retransmit the packet (in other words, to relay said packet) to said destination equipment item.

It is important to note that said intermediate device is located appropriately to receive (and not to intercept) said at least one data packet, and thus analyze its contents. In other words, the intermediate device is located such that said at least one data packet it receives is actually addressed to it, without having to make an interception without the user of said at least one terminal knowing. It thus also becomes apparent from these elements that the procedure for which the invention makes provision is initialized at the request of the entity to which said at least one terminal belongs.

Thus, and as will be described in more detail below, the intermediate device can for example be located on a route for routing data packets. Such a route is for example configured as default at the level of said at least one terminal, or else can be a route set up dynamically to allow the routing of said at least one data packet.

Alternatively (if the intermediate device is not placed on any route for routing data packets) or in addition to these provisions, the intermediate device can be connected to the terminal using at least one communication tunnel able to force the routing of data packets from said at least one terminal toward the intermediate device. Advantageously, said at least one tunnel is configured to implement a secure connection.

In particular modes of implementation, said set of steps executed by the processing device incorporated into said intermediate device further includes:

- the receiving of the obtainment request emitted by said at least one terminal,
- in response to said obtainment request, the transmitting to said at least one terminal of at least one control rule.

It will be understood that in such modes, the intermediate device is asked by said at least one terminal so that the latter obtains the control rule or rules, which it then sets out to apply to data packets.

In particular modes of implementation, said set of steps executed by the processing device incorporated into said intermediate device further includes the transmission, on said processing device's own initiative, of at least one control rule addressed to said at least one terminal.

Such modes are therefore different from those in which the intermediate device is asked by said at least one terminal to obtain one or more control rules.

In particular modes of implementation, said method further includes a step of implemented, by the processing device incorporated into said intermediate device, and consisting in executing a learning algorithm for detecting at least one recurring data pattern contained in a set of data packets emitted by said at least one terminal, said applying step executed by said processing device further including, if at least one recurring data pattern is detected, an application of a rule for controlling the broadcasting of said at least one detected recurring data pattern.

In particular modes of implementation, said set of steps executed by the processing device incorporated into said intermediate device further includes a step of searching for said at least one sensitive datum associated with said at least one control rule in said at least one data packet, said searching step being implemented by said processing device if a criterion of authorization to search for sensitive data for said at least one terminal is satisfied.

Said authorization criterion is for example representative of a subscription on behalf of the user of a mobile terminal (or User Equipment (UE)) to a contract with the access provider responsible for managing an access network. This contract more specifically concerns a paid service, offered by said access provider to allow the search for, and optionally modification of sensitive data by an intermediate device.

Conversely, it can also be envisioned, for example, for the service provided by the access provider to be free, said authorization criterion then referring to the consent granted by the entity for the sensitive data to be searched for, and optionally modified, in packets emitted by said at least one terminal.

In particular modes of implementation, sensitive data are inserted into said at least one packet by at least any one of the components from among:

- an operating system equipping said at least one terminal,
- a software application installed on said at least one terminal,
- an access network to which said at least one terminal is connected, and connected to the network via which said destination equipment item is accessible,
- a local network to which said at least one terminal is connected, and connected to said access network.

Note that it is conventional to consider an operating system or a software application as a source of sensitive data. However, and as already described above, the invention is not limited to this type of source, but also covers the case of sensitive data transmitted (typically without the user of said at least one terminal knowing) by the local network and/or by the access network. This is because these networks are able to inject sensitive data into packets emitted by said at least one terminal toward the network via which said destination equipment item is accessible. The injection of these data is for example done at application level (e.g. in the headers of the communication protocol used for data transmission such as, for example, the HTTP protocol, in the TCP options, in the IPV4 options, in the IPV6 extension headers, in the UDP (User Datagram Protocol) options, etc.).

In other words, the fact of considering certain data injected by the local network and/or by the access network as sensitive data advantageously makes it possible to expand the concept of sensitive data, and therefore to ultimately improve the assessment of the risk of items of identification information relating to the entity to which said at least one terminal belongs and/or its environment being accessible without it knowing.

In particular modes of implementation, a rule for controlling the broadcasting of at least one sensitive datum is any of the items of a list comprising:

- the deletion of all or part of said at least one sensitive datum,
- the replacement of all or part of said at least one sensitive datum with one or more other data,
- the adding of at least one datum to said at least one packet,
- the modifying of the order of appearance of said at least one sensitive datum in said at least one packet.

According to a second aspect, the invention relates to a computer program including instructions for implementing a processing method according to the invention when said computer program is executed by a computer.

This program can use any programming language, and be in the form of source code, object code or intermediate code between source code and object code, such as in a partially compiled form, or in any other desirable form.

According to a third aspect, the invention relates to an information or recording medium readable by a computer, on which is recorded a computer program according to the invention.

The information or recording medium can be any entity or device capable of storing the program. For example, the medium can include a storage means, such as a ROM, for example a CD-ROM or a microelectronic circuit ROM, or else a magnetic storage means, for example a hard disk.

Moreover, the information or recording medium can be a transmissible medium such as an electrical or optical signal, which can be routed via an electrical or optical cable, by radio or by other means. The program according to the invention can in particular be downloaded over a network such an IP network, such as, typically, the Internet network.

Alternatively, the information or recording medium can be an integrated circuit into which the program is incorporated, the circuit being suitable for executing or being used in the execution of the method in question.

According to a fourth aspect, the invention relates to a device for processing at least one data packet generated by at least one terminal connected to a network, said at least one data packet having as destination a so-called "destination" equipment item accessible via said network, items of identification information relating to the identity and/or environment of an entity to which said at least one terminal belongs being able to be predetermined from sensitive data having been inserted into said at least one packet before it reaches said destination equipment item. Said searching device is separate from said destination equipment item and includes:

- an obtaining module configured to obtain at least one rule for controlling the broadcasting of at least one predetermined sensitive data,
- an applying module configured to apply said at least one control rule to said at least one data packet if said sensitive datum associated with said at least one control rule is detected in said at least one data packet.

According to a fifth aspect, the invention relates to a communication terminal including a processing device according to the invention, said processing device further including an emitting module configured to emit said at least one packet, said emitting being done after said at least one control rule is applied by the applying module if said at least one sensitive datum is detected in said at least one data packet.

According to a sixth aspect, the invention relates to a device, the so-called "intermediate device", including a processing device according to the invention, said intermediate device being separate from said at least one terminal, said processing device further including:

- the receiving module configured to receive said at least one data packet,
- an emitting module configured to relay said at least one data packet to the destination equipment item, the relaying of said at least one received data packet being done after said at least one control rule is applied by the applying module if said sensitive datum is detected in said at least one data packet.

In particular embodiments, the intermediate device can further include one or more of the following features, taken in isolation or in any technically possible combination.

In particular embodiments, said intermediate device is located on a route for routing said at least one data packet toward said destination equipment item or is connected to the terminal by a tunnel.

In particular embodiments, said intermediate device is deployed in:

- the network via which said destination equipment item is accessible,
- an access network connected to the network via which said destination equipment item is accessible,
- a local network to which said at least one terminal is connected, and connected to said access network.

According to a seventh aspect, the invention relates to a so-called sensitive data managing system including a communication terminal according to the invention and an intermediate device according to the invention.

BRIEF DESCRIPTION OF THE DRAWINGS

Other features and advantages of this invention will become apparent from the description given below, with reference to the appended drawings which illustrate an exemplary embodiment thereof devoid of any limitation. In the figures:

FIG. 1 schematically represents, in its environment, a particular embodiment of a sensitive data managing system according to the invention;

FIG. 2 schematically represents an example of a hardware architecture of a processing device according to the invention and incorporated into a communication terminal belonging to the sensitive data managing system of FIG. 1;

FIG. 3 schematically represents an example of a hardware architecture of another processing device, the so-called "intermediate" device, separate from the terminal of FIG. 2, and belonging to the sensitive data managing system of FIG. 1;

FIG. 4 represents, in the form of a flowchart, a particular embodiment of a method for processing at least one data packet implemented by the sensitive data managing system of FIG. 1.

DESCRIPTION OF THE EMBODIMENTS

FIG. 1 schematically represents, in its environment, a particular embodiment of a sensitive data managing system SYS according to the invention.

In the embodiment of FIG. 1, the sensitive data managing system SYS includes a plurality of entities, including in particular a communication terminal UE.

As illustrated by FIG. 1, the system SYS includes in this embodiment a single terminal UE. Said terminal UE is owned by a user (not shown in the figures) and corresponds in this embodiment to a smartphone. This being the case, no limitation is attached to the nature of the terminal UE which can thus interchangeably take the form of a digital tablet, a portable computer, a personal digital assistant, etc.

The fact of considering only a single terminal UE within the sensitive data managing system SYS is here only a choice made for the purpose of simplifying the description. It should thus be noted that, in general, no hypothesis is made as to the number of terminals that can be considered in the context of this invention. Moreover, if the sensitive data managing system SYS includes several terminals, nothing precludes a user from being in possession of all or some of these terminals, in which case it can be viewed as an administrator of terminals that it has in its possession.

The terminal UE is connected to an access network NET_ACC, the management of which is ensured by a network operator (or else an access provider) from which the user of the terminal UE has taken out an access subscription.

More specifically, in the embodiment of FIG. 1, the terminal UE is first connected to a local network NET_LOC, for example by means of an access point (not shown in the figures), said local network NET_LOC being itself connected to the access network NET_ACC by means of a dedicated equipment item. In a manner known per se, such a dedicated equipment item is of CPE (Customer Premises Equipment) type, and is for example a home gateway (or residential gateway).

In accordance with the invention, the access network NET_ACC is itself connected to a so-called "global" network NET_GLOB via which the terminal UE can transmit data (emitted in the form of data packets).

By way of example without any limitation, the terminal UE is connected to the local network NET_LOC provided by an WLAN (Wireless Local Access Network) access point to cover one or more parts of the home where a person who owns said terminal UE lives (the local network NET_LOC therefore corresponds here to a home network). In this example, the global network NET_GLOB corresponds to the Internet public network, and the access network NET_ACC is the network of an Internet access provider from which said person has taken out a subscription.

Of course, other examples of configuration may be envisioned. In particular, nothing precludes the considering of a global network NET_GLOB that differs from the Internet network.

Thus, according to another example, said global network NET_GLOB may be a network that is the property of a company and deployed between the premises of said company by means of dedicated infrastructures, or else a VPN (Virtual Private Network) network, again deployed by said company. Furthermore, in this example, the access network NET_ACC may be an intranet network of a site of the company. The local network NET_LOC, meanwhile, may be a network deployed in a targeted part of the premises of the company.

In general, no hypothesis is made as to the context in which said local NET_LOC, access NET_ACC and global NET_GLOB networks are deployed, such that the nature of these networks does not constitute a limiting factor of the invention. However, to define a descriptive framework, it will henceforth be considered without any limitation that the global network NET_GLOB is the Internet network.

It is moreover important to note that the fact of envisioning that the terminal UE is connected to the access network NET_ACC via the local network NET_LOC constitutes only one variant of implementation of the invention. Thus, nothing precludes, for example, the envisioning of another variant in which the terminal UE is directly connected to the access network NET_ACC, since no local network is deployed (and therefore no local CPE equipment item is used for the routing of data packets emitted by the terminal UE).

Nor does anything preclude the envisioning of yet another variant of implementation of the invention in which a local network NET_LOC is deployed in a way similar to the configuration of FIG. 1, and in which the terminal UE is equipped with a first interface allowing it to connect to said local network NET_LOC (for example a WLAN interface to connect to a local network NET_LOC), along with a second interface allowing it to connect directly to the access network NET_ACC (for example a 5G interface to connect to an access network NET_ACC of cellular type deployed by a mobile telephony operator).

As illustrated by FIG. 1, a single access network NET_ACC is considered in this embodiment, such that the equipment item CPE is connected to this single access network NET_ACC. However, such dispositions are here adopted solely for the sake of simplifying the description, and it of course remains possible to envision an equipment item CPE connected to a plurality of separate access networks (the "multi-homing" concept).

Conventionally, the terminal UE is configured to emit data packets through the access network NET_ACC, these packets being then intended to travel over the Internet network NET_GLOB.

For this purpose, the terminal UE includes software and/or hardware means configured to emit said data packets. In particular, in this embodiment, the terminal UE is equipped with an operating system OS along with a plurality of software applications APP_1, . . . , APP_N (N being an integer index greater than or equal to 1).

Nothing however precludes the envisioning of said terminal UE being equipped with no application.

Said operating system OS (or respectively an application APP_i, i being any index between 1 and N) is able to transmit data packets, each of these packets having as destination a so-called "destination" equipment item accessible via the Internet network NET_GLOB, and it being understood that a plurality of destination equipment items may be used, simultaneously or else sequentially over time, by said operating system OS (or said application APP_i respectively).

For the remainder of the description, it will be considered without limitation, and solely for the sake of simplifying the description, that the operating system OS (or said application APP_i respectively) transmits data packets to a single destination equipment item EQUIP_OS (or EQUIP_APP_i respectively). Said destination equipment item EQUIP_OS (or EQUIP_APP_i respectively) typically includes one or more servers, the management of which is done by the manufacturer/designer of said operating system OS (or said application APP_i respectively). When an equipment item includes a plurality of servers, these servers can, for example, be located within one and the same structure (for example in a so-called "cloud" infrastructure), or else be distributed within a plurality of suitable structures.

It should moreover be noted that, in this embodiment and as illustrated in FIG. 1, each destination equipment item EQUIP_OS, EQUIP_APP_i is connected to the global network NET_GLOB. That being said, nothing precludes the envisioning of other embodiments in which all or some of these destination equipment item EQUIP_OS, EQUIP_APP_i is connected directly to the access network NET_ACC.

In a known manner, the data packets transmitted by the operating system OS (or the application APP_i respectively) to the destination equipment item EQUIP_OS (EQUIP_APP_i respectively) may contain data from which it is possible to determine items of identification information relating to the identity and/or environment of the user possessing the terminal UE.

Note that the fact of being able to obtain such items of identification information from such data inserted into the transmitted packets (typically without the user knowing of the terminal UE) makes it possible to classify these latter as "sensitive data".

Note also that one or more applications embedded in the terminal UE can for example be supplied by the developer of the operating system OS itself. In this case, the risk that particularly precise items of identification information may be derived from a correlation between the data emitted by these applications and the operating system OS is even higher.

The concept of "user environment" refers to any entity with which it is possible to associate an identity of its own (i.e. which can be used to distinguish it from another entity). It can, for example, be terminals (and therefore, ultimately, users to which they belong) located in the neighborhood of the terminal UE, networks via which the terminal UE transmits data, items of equipment operated by one or more companies and the operation of which entail the transmission of data over networks also used by the terminal UE, etc.

The obtaining of such items of identification information is done based on the collection of sensitive data transmitted by the operating system OS (or respectively by the application APP_i), as well as by the implementation of specific processing for the sensitive data thus collected. Said processing consists, for example, in extracting or deducing items of identification information from collected sensitive data. They can also consist in correlating the sensitive data collected with other data, such as for example location data of GPS type. Note moreover that the processing in question can be executed by the equipment items EQUIP_OS, EQUIP_APP_i themselves, or else be delegated by these equipment items to dedicated processing means.

In general, those skilled in the art know the types of processing that can be done based on sensitive data (e.g. syntax checking, integrity checking, correlation, aggregation, de-anonymization), so as to be able to determine items of identification information relating to the identity and/or environment of the user who is using the terminal UE.

The point of view taken until now as to the origin of the sensitive data is intended to be conventional insofar as it has been described that these could be transmitted by the operating system OS and/or by the applications APP_1, . . . , APP_N. The invention is not however limited to this type of sensitive data, but also covers the case of sensitive data transmitted (typically without the user knowing of the terminal UE) by the local network NET_LOC and/or by the access network NET_ACC. These networks are indeed able to inject sensitive data into packets emitted by the terminal UE to the Internet network NET_GLOB. The injection of these data is, for example, done at application level (e.g. in the headers of the communication protocol used for the transmission of data such as the HTTP protocol, in the TCP options, in the IPV4 options, in the IPV6 extension headers, in UDP options, etc.).

The fact of considering certain data injected by the local network NET_LOC and/or by the access network NET_ACC as sensitive data thus advantageously makes it possible to expand the concept of sensitive data, and thus ultimately to improve the assessment of the overall risk of items of identification information relating to the user of the terminal UE and/or to its environment being accessible (typically without it knowing).

In general, within the meaning of the invention, a sensitive datum is any one of the items in a list comprising:

- a datum of location of the terminal UE (e.g. a datum of GPS type),
- an IMSI or MSISDN or IMEI number associated with said terminal UE,
- a SIM card number equipping said terminal UE,
- an identifier of the access network NET_ACC (e.g. an IPV6 prefix of the access network NET_ACC),
- an identifier of said local network (e.g. a prefix IPV6 of the local network NET_LOC, a MAC hardware address of the equipment item CPE),
- an IP address or a MAC hardware address of the terminal UE,
- an IP address or a MAC hardware address of at least one other terminal positioned in a neighborhood of said terminal UE,
- a persistent identifier associated with said at least one terminal (e.g. a hardware serial number).

It is important to note that this list is not comprehensive, and it is of course possible to consider yet other sensitive data, this aspect being known to those skilled in the art.

In its general principle, the invention consists in controlling the broadcasting of at least one sensitive datum present in at least one data packet transmitted or intended to be transmitted by the terminal UE (typically without its user knowing), before said at least one data packet even travels through the Internet network NET_GLOB, to reach the destination equipment items EQUIP_OS, EQUIP_APP_i associated with it.

The fact of controlling the broadcasting of certain data coming from the terminal UE offers the possibility of limiting the exposure of items of identification information of the user of the terminal UE, the preservation of the privacy of this user being hence improved thereby.

The term "controlling the broadcasting" here refers, firstly, to the fact of verifying that one or more predetermined sensitive data are present in at least one data packet originating from the terminal UE. In accordance with the invention, such a verification is implemented based on rules, so-called "control rules", configured to denote said sensitive data to be identified in said at least one data packet. The "controlling the broadcasting" also refers, secondly, to the fact of supplying (via said control rules) instructions for processing the contents of said at least one data packet (deletion and/or replacement and/or movement of sensitive data detected in said at least one packet and associated with control rules, or else again addition of data to said at least one packet, etc.).

By way of example, a rule for controlling the broadcasting of at least one sensitive data of at least one data packet may be one of the following items:

- the deletion of all or part of said at least one sensitive datum,
- the replacement of all or part of said at least one sensitive datum with one or more other data.

In a more specific example, a rule for controlling the broadcasting of at least one sensitive datum of at least one data packet may be one of the following items:

- the deletion of an item of location datum of the terminal UE or the replacement of said location datum by a fictitious location datum (i.e. the fictitious location datum indicates a location of the terminal UE that differs from its true location) or with a lesser degree of precision or otherwise in relation to the true location of the terminal UE,
- the deletion of an IMSI or MSISDN or IMEI number associated with said terminal UE,
- the deletion of a SIM card number equipping said terminal UE,
- the deletion of an identifier of an access network NET_ACC and/or of an identifier of an operator in charge of managing said access network NET_ACC,
- the deletion of an identifier of the local network NET_LOC and/or of a persistent identifier of the equipment item CPE making the connection between the local network NET_LOC and the access network NET_ACC,
- the replacement of an IP address or of a hardware address of said terminal UE with another IP address or another hardware address (said other address being able to be, for example, randomly generated),
- the deletion of an IP address or of a hardware address of said terminal UE,
- the replacement of an IP address or of a hardware address of at least one other terminal positioned in a neighborhood of said terminal UE having generated said at least one packet with another IP address or another hardware address,
- the deletion of an IP address or of a hardware address of at least one other terminal positioned in a neighborhood of said terminal UE having generated said at least one packet,
- the replacement or deletion of a persistent identifier associated with said terminal UE.

It should be noted that the control rules that can be envisioned within the meaning of this invention are not limited to those described above (deletion or replacement). Thus, according to yet other examples, a rule for controlling the broadcasting of at least one sensitive datum of at least one data packet can refer to:

- the addition of at least one datum to said at least one data packet (this addition being conditional on the fact that said at least one sensitive datum is detected in said at least one packet). For example, one may envision the addition of an HTTP header to minimize the sole identification of the terminal UE containing a value common to several terminals,
- the modification of the order of appearance of said at least one datum in said at least one packet. For example, during a connection to an HTTP server, certain browsers communicate to the HTTP server items of information concerning the languages supported, the fonts, the plug-ins, etc. These items of information are listed by the browser of a terminal in a random order.

Terminals having the same local configuration can thus be identified using this random order. One can therefore envision modifying the random order to replace it with an alphabetical order so that it is no longer possible to distinguish between two terminals on the basis of the order of the items of information supplied by the browsers.

The managing system SYS includes, in the embodiment described here, a plurality of devices, so-called "processing devices", each of these processing devices being configured to search for sensitive data in data packets originating in the terminal UE, and also to execute instructions for processing the contents of these packets if the searched-for sensitive data re detected therein, by implementing the steps of a processing method according to the invention.

In particular, in the embodiment described here, the terminal UE includes a processing device DT_UE (i.e. a processing device is contained in the terminal UE).

Moreover, the managing system SYS also includes, in this embodiment, another processing device DT_PAP incorporated into a so-called "intermediate device PAP" (for Provider Assisted Privacy enforcement point) and separate from said terminal UE and from the destination equipment items EQUIP_OS, EQUIP_APP_i.

The hardware and software configuration of each of said processing devices DT_UE, DT_PAP considered in this embodiment, to implement steps of said processing method, is described in more detail further on. The remainder of the description first focuses on the locations that can be envisioned for said intermediate device PAP containing the processing device DT_PAP.

As illustrated by FIG. 1, the intermediate device PAP is deployed in the access network NET_ACC. Furthermore, said intermediate device PAP is directly connected to the terminal UE by a communication tunnel TUN making it possible to force the routing of data packets from the terminal UE toward said intermediate device PAP (i.e. the intermediate device PAP is not located on any route for routing a data packet to its destination), and also to set up, in the embodiment described here, a secure connection between these latters.

It should be noted that the transmission of data via said communication tunnel TUN_1 is done, in a manner known per se, by implementing an encapsulation, or else an encryption, of the transmitted data. No limitation is attached to the encapsulation protocol that can be envisioned (IPsec, TLS, QUIC, GRE, DTLS, etc.).

The fact of considering, in this embodiment, a single tunnel TUN between the terminal UE and the intermediate device PAP constitutes only one variant of implementation of the invention. Thus, nothing precludes the envisioning of other variants in which a plurality of tunnels are deployed between the terminal UE and the intermediate device PAP, these tunnels making it possible, for example, for data to be exchanged between the terminal UE and the intermediate device PAP using separate respective interfaces (e.g. WLAN, 3G, 4G, 5G, etc.). It should also be noted that these tunnels can also use separate addresses from the intermediate device PAP. Also, for reasons of minimization of the tracking of the connections of a client over time, the address or addresses of the intermediate device PAP can be dynamic, contrary to a mode in which this address or addresses is or are allocated permanently or statically (so-called "static" addresses).

Nor does anything preclude the envisioning of other embodiments in which a tunnel does not directly connect the terminal UE and the intermediate device PAP. For example, the tunnel TUN can be deployed between the CPE and the intermediate device PAP in the case where said CPE itself contains an intermediate device.

It can moreover be envisioned for said tunnel TUN to not be a secure tunnel.

As mentioned above, the communication tunnel TUN makes it possible to force the routing of data packets from the terminal UE to the intermediate device PAP, and it is necessary insofar as this latter is not located on a route for routing data packets to the destination equipment items EQUIP_OS, EQUIP_APP_i. The fact remains that the use of a communication tunnel is not limited to such arrangements, and can in particular be envisioned for an intermediate device already placed on such a route configured as default, in particular to secure the transmission of the routed data via said tunnel (e.g. a local root is installed on the terminal UE to be able to involve at least one intermediate device in a secure connection set up for a route taken by data packets to a destination equipment item).

It should be noted that the default configuration of a route for routing data packets to the destination equipment items EQUIP_OS, EQUIP_APP_i is for example done on the terminal UE. According to another example, this configuration is done on the equipment item CPE itself.

Note moreover that, particularly for reasons of optimization, the terminal UE can be configured such as to transmit only certain data packets via the communication tunnel TUN to the intermediate device PAP, the others being routed directly to their addressee (for example via a route configured as default) without traveling via the intermediate device PAP. For example, the terminal UE can be configured to transmit to the intermediate device PAP only the data packets emitted when setting up a connection, and delete the intermediate device PAP from the communication path taken by the data packets emitted later on. Such a configuration can be put in place at the level of the terminal UE by the user of the terminal or by the access provider FAI managing the access network NET_ACC for example. It makes it possible to reduce the load at the intermediate device PAP.

Although it is considered in this embodiment that the intermediate device PAP is located in the access network NET_ACC, this is only one variant implementation of the invention. Thus, other locations can be envisioned, such as for example in the equipment item CPE, in the internet network NET_GLOB or else in the local network NET_LOC. Of course, all the technical considerations described above concerning the implementation of a communication tunnel still apply if the intermediate device PAP occupies one of these other locations.

For the sake of simplification, this embodiment is moreover described considering that a single intermediate device PAP is deployed. It should however be recalled that no hypothesis is made as to the number of intermediate devices that can be considered. In addition, in the hypothesis where several intermediate devices are deployed, nothing precludes all or part of said intermediate devices being deployed only in a sub-set of the list formed of the access networks NET_ACC, of the Internet network NET_GLOB and of the equipment item CPE. And even though several intermediate devices are deployed, these latters are not necessarily all activated.

Finally, no hypothesis is made as to the number and location of said intermediate device(s) used for the implementation of the invention. It is however important to mention that the fact of having an intermediate device (or optionally several intermediate devices) deployed in the Internet network NET_GLOB advantageously makes it possible to control whether or not sensitive data are injected by the local network NET_LOC and/or the access network NET_ACC into data packets emitted by the terminal UE.

FIG. 2 schematically represents an example of a hardware architecture of the processing device DT_UE incorporated into the terminal UE belonging to the sensitive data managing system SYS of FIG. 1.

As illustrated by FIG. 2, the processing device DT_UE possesses the hardware architecture of a computer. Thus, the processing device DT_UE includes, in particular, a processor 1_UE, a random access memory 2_UE, a read-only memory 3_UE and a non-volatile memory 4_UE. It moreover includes a communicating module 5_UE.

The read-only memory 3_UE of the processing device DT_UE constitutes a recording medium in accordance with the invention, readable by the processor 1_UE and on which is recorded a computer program PROG_UE in accordance with the invention, including instructions for executing steps of a particular mode of implementation of the processing method according to the invention. The program PROG_UE defines functional modules of the processing device UE, which rely on or control the hardware elements 1_UE to 5_UE of the terminal UE mentioned previously, and which in particular comprise in the embodiment described here:

- an obtaining module MOD_OBT_UE configured to obtain at least one rule for controlling the broadcasting of at least one predetermined sensitive datum,
- a searching module MOD_ID_UE configured to search for the sensitive datum associated with said at least one control rule in at least one data packet,
- an applying module MOD_EXEC_UE configured to apply said at least one control rule to said at least one data packet if said sensitive datum is detected in said at least one data packet,
- an updating module MOD_UPD_UE configured to update said at least one obtained control rule,
- an emitting module MOD_TX_UE configured to emit said at least one data packet.

More specifically, in this embodiment, the obtaining module MOD_OBT_UE includes:

an emitting sub-module SS_MOD_TX_UE configured to emit a request to obtain at least one control rule, a receiving sub-module SS_MOD_RX_UE configured to receive said at least one control rule in response to said obtainment request.

Note that, in this embodiment, the communicating module 5_UE contains the emitting module MOD_TX_UE and also the obtaining module MOD_OBT_UE.

In the embodiment described here, it is considered without any limitation that a request to obtain at least one control rule is addressed to the intermediate device PAP. In other words, said intermediate device PAP (more specifically the processing device DT_PAP) is that which provides the processing device DT_UE (and therefore of necessity the terminal UE) with at least one control rule in response to the received obtainment request.

Of course, nothing precludes the envisioning of other embodiments in which at least one control rule is supplied to the terminal UE by an entity other than the intermediate device PAP. By way of example without any limitation, the supplying of at least one control rule, in response to a request emitted by the terminal UE, can be done by a dedicated server belonging to the access provider FAI responsible for managing the access network NET_ACC.

More generally, nothing precludes the envisioning of other embodiments still, in which the transmission of at least one control rule to the terminal UE is done by the intermediate device PAP (via its processing device DT_PAP) on its own initiative. In other words, in these other modes, said transmission of at least one control rule is not conditional on the receiving, by the intermediate device PAP, of an obtainment request from the terminal UE (i.e. the intermediate device PAP is not deliberately asked for it by the terminal UE). For example, the transmission of at least one control rule to the terminal UE can be done by the intermediate device PAP when the latter receives one or more data packets coming from said terminal UE. According to another example, this transmission can be done with a given frequency.

It should be noted that no hypothesis is made as to the number of control rules that can be obtained by the terminal UE.

It is also important to note that a request emitted by the terminal UE may concern, as such, the sole action of obtaining one or more control rules (i.e. without explicitly designating one or more control rules that said terminal UE might wish to obtain). In other words, the contents are not specified by the terminal UE when it emits an obtainment request, these contents remaining solely under the control (at the time of emission of said obtainment request) of the intermediate device PAP or of another entity.

As an alternative, it is possible to envision the processing device DT_UE being configured to allow the user of the terminal UE to designate one or more given predetermined control rules that it specifically wishes to obtain.

The control rule or rules obtained by the terminal UE form a set of control rules, also known as "user profile PROFIL_UE" in the rest of the description. It is also henceforth assumed, without any limitation, that a request emitted by the terminal UE concerns the sole action of obtaining such a profile UE (and not the obtaining of one or more predetermined control rules).

According to an exemplary embodiment, the user profile PROFIL_UE can be configured by the access provider FAI managing the access network NET_ACC, and communicated to the processing device DT_PAP of the intermediate device PAP so that it transmits it to the terminal UE on receiving an obtainment request.

According to another example, the processing device DT_PAP is configured in hardware and software to analyze a flow of data packets coming from the terminal UE and carry out processing to search for sensitive data in these packets, the implementation of this search being able to be conditioned by the fact that the data are emitted by one or more predetermined given sources (operating system OS, application APP_i, local network NET_LOC, access network NET_ACC). In this example, the processing device DT_PAP is also configured in hardware and software to generate a user profile PROFIL_UE intended for the terminal UE on the basis of the sensitive data thus identified.

Such provisions are advantageous in that they offer the processing device DT_PAP (and therefore ultimately the intermediate device PAP) the possibility of supplying the terminal UE with a user profile PROFIL_UE adapted to this terminal, according to the identified sensitive data, and such as to limit the exposure of items of identification information relating to the user of the terminal UE. Put still otherwise, the processing device DT_PAP is configured in this example so as to be able to make recommendations to the terminal UE via the user profile PROFIL_UE which it generates and which it transmits to it on receiving an obtainment request. These recommendations can for example consists in control rules with the aim of:

preventing (or even prohibiting) the sharing of items of information relating to entities located in the environment of the terminal UE, favoring the use of specific values for one or more headers of a communication protocol used by the terminal UE, such as to avoid the terminal UE being recognized/identified unambiguously (e.g. HTTP headers "User Agent", "HTTP_ACCEPT", "Plugins", etc.), etc.

Independently of the way in which the terminal UE obtains a user profile PROFIL_UE, the updating module MOD_UPD_UE equipping the processing device DT_UE of the terminal UE offers this latter the possibility of updating said user profile PROFIL_UE obtained. Such an update is for example made by the user itself by means of an interface (screen, keyboard etc.) of its terminal UE. Alternatively, the user of the terminal UE can inform the access provider FAI of its desire for an update, such that the user profile PROFIL_UE updated by the access provider FAI, is transmitted to the processing device DT_PAP of the intermediate device PAP which can then relay it to the terminal UE in response to an obtainment request.

The updating of a user profile PROFIL_UE may concern, for example, the deletion by the user of the terminal UE of one or more control rules contained in said user profile PROFIL_UE.

Alternatively, or additionally, the updating of a user profile PROFIL_UE may, for example, concern the addition by the user of the terminal UE of one or more control rules contained in said user profile PROFIL_UE, such as to limit still further the exposure of items of identification information of the user of the terminal UE.

In general, no hypothesis is made as to the way in which the user can update the user profile PROFIL_UE which it obtains from the intermediate device PAP. In particular, nothing of course precludes any update from being executed. Moreover, within the meaning of this invention, the presence of said update module is optional.

Moreover, it is important to note that such an update of a user profile PROFIL_UE can be implemented by an entity other than the user of the terminal UE itself. Indeed, it is not out of the question to consider embodiments of the invention in which several terminals are active. In this case, the entity in question can for example be an entity in charge of the management of said plurality of terminals. These aspects are described in more detail further on.

As described above, the invention can also cover embodiments in which several terminals belong to the managing system SYS. Also, in such modes, nothing precludes the envisioning of all or some of the user profiles associated with these terminals being separate from one another.

As also mentioned above, the intermediate device PAP is directly connected to the terminal UE by a communication tunnel TUN making it possible to force the routing of data packets coming from the terminal UE toward said intermediate device PAP. The setting-up of said tunnel TUN, once the terminal UE is aware of the existence of the intermediate device PAP, follows technical procedures known to those skilled in the art, and which are therefore not further described here.

As regards the awareness of the existence of the intermediate device PAP, this can, for example, be the result of a discovery procedure implemented by the terminal UE (sending of appropriate requests, receiving of answers to said requests etc.), in which case the terminal UE includes hardware and/or software means configured to implement such a discovery procedure. According to another example, the awareness of the existence of the intermediate device PAP is the result of the transmission of items of information from the access provider FAI. In general, no limitation is attached to the way in which the terminal UE gains awareness of the existence of the intermediate device PAP.

As regards the obtaining module MOD_OBT_UE, the latter can for example be more specifically configured to iterate the emitting of an obtainment request with a predetermined frequency. Proceeding in this way allows the terminal UE to regularly renew the user profile PROFIL_UE it receives, which is particularly advantageous in the case where the intermediate device PAP is able to make recommendations to the terminal UE as described previously. By way of example without any limitation, the user profile PROFIL_UE can be associated with a given validity period, for example indicated in items of description information contained in the user profile PROFIL_UE. This validity period determines the frequency with which an obtainment request is emitted.

FIG. 3 schematically represents an example of a hardware architecture of the processing device DT_PAP incorporated into the intermediate device PAP belonging to the sensitive data managing system SYS of FIG. 1.

The processing device DT_PAP possesses the hardware architecture of a computer. The processing device DT_PAP includes, in particular, a processor 1_PAP, a random access memory 2_PAP, a read-only memory 3_PAP and a non-volatile memory 4_PAP. It further includes a communicating module 5_PAP.

The read-only memory 3_PAP of the processing device DT_PAP constitutes a recording medium in accordance with the invention, readable by the processor 1_PAP and on which is recorded a computer program PROG_PAP in accordance with the invention, including instructions for executing steps of a particular mode of implementation of the processing method according to the invention. The program PROG_PAP defines functional modules of the processing device DT_PAP, which rely on or control the hardware components 1_PAP to 5_PAP of the processing device DT_PAP mentioned previously, and which in particular comprise, in the embodiment described here:

- a first receiving module MOD1_RX_PAP configured to receive, coming from the terminal UE, a request to obtain at least one control rule,
- a second receiving module MOD2_RX_PAP configured to receive at least one data packet coming from the terminal UE,
- a first emitting module MOD1_TX_PAP configured to transmit to the terminal UE, in response to said obtainment request, at least one control rule,
- a second emitting module MOD2_TX_PAP configured to relay said at least one data packet received to the destination equipment item EQUIP_OS, EQUIP_APP_i which is associated with it,
- an obtaining module MOD_OBT_PAP configured to obtain at least one rule for controlling the broadcasting of at least one predetermined sensitive datum,
- a verifying module MOD_VERIF_PAP configured to verify whether or not a criterion of authorization CRIT_AUTH to search for sensitive data for the terminal UE is satisfied,
- a searching module MOD_ID_PAP configured to search for the sensitive datum associated with said at least one control rule in at least one data packet,
- an applying module MOD_EXEC_PAP configured to apply said at least one control rule to said at least one data packet if said sensitive datum is detected said at least one data packet.

The communicating module 5_PAP, meanwhile, is in particular configured to allow the intermediate device PAP to receive data coming from the terminal UE, and also to transmit data to the destination equipment items EQUIP_OS, EQUIP_APP_i. For this purpose, the communicating module 5_PAP contains the first and second receiving modules MOD1_RX_PAP, MOD2_RX_PAP, along with the first and second emitting modules MOD1_TX_PAP, MOD2_TX_PAP.

Note moreover that the second emitting module MOD2_TX_PAP is more specifically configured to relay said at least one data packet received after a search is made for said at least one packet by the searching module MOD_ID_PAP, and also, where applicable, after one or more control rules are applied for said at least one packet by the applying module MOD_EXEC_PAP.

Thus, the second emitting module MOD2_TX_PAP equipping the processing device DT_PAP allows the latter to act as a proxy between the terminal UE and the destination equipment item EQUIP_OS, EQUIP_APP_i to which a data packet is addressed. If this second emitting module MOD2_TX_PAP was not present, then a data packet emitted by the terminal UE to a destination equipment item EQUIP_OS, EQUIP_APP_i and which would be received by the intermediate device PAP could not be routed beyond said intermediate device PAP insofar as this latter is placed to intercept the flow between the terminal UE and the appropriate destination equipment item EQUIP_OS, EQUIP_APP_i.

As mentioned above, the processing device DT_PAP includes an obtaining module MOD_OBT_PAP allowing it to obtain one or more control rules which hence form a set of control rules, also known as "PROFIL_PAP profile" in the remainder of the description.

In this embodiment, and unlike the obtaining module MOD_OBT_UE equipping the processing device of the terminal UE, the obtaining module MOD_OBT_PAP is only configured to receive said profile PROFIL_PAP, for example coming from the access provider FAI managing the access network NET_ACC and after the latter has configured said profile PROFIL_PAP. The transmission of the profile PROFIL_PAP to the intermediate device PAP is for example performed a single time, before any implementation of a search for sensitive data associated with the control rule or rules included in the profile PROFIL_PAP. Alternatively, the transmission of the profile PROFIL_PAP to the intermediate device PAP can be done repeatedly, for example with a predetermined frequency, so as to be able to take into account any changes that the access supplier FAI (or more generally an entity controlling the intermediate device PAP) desires to implement at the level of said profile PROFIL_PAP.

The fact of considering that the obtaining module MOD_OBT_PAP is only configured to receive said profile PROFIL_PAP of course constitutes only one variant of implementation of the invention. Thus, nothing precludes the envisioning of the obtaining of the profile PROFIL_PAP, by the intermediate device PAP, being done according to similar arrangements to those described for the terminal UE in the context of the obtaining of the profile PROFIL_UE (sending of a request, receipt of a profile in response to said request).

According to an exemplary embodiment, the profile PROFIL_PAP is identical to the user profile PROFIL_UE associated with the terminal UE. Although such an implementation can appear redundant, it nonetheless has the advantage of offsetting any failure of the processing device DT_UE of the terminal UE in the application of the control rules included in the user profile PROFIL_UE.

According to another exemplary embodiment, all or part of the profile PROFIL_PAP is separate from the user profile PROFIL_UE. Such dispositions in particular make it possible to consider a profile PROFIL_PAP including one or more control rules pertaining to one or more sensitive data injected into the data packets by the local network NET_LOC and/or the access network NET_ACC. Such an implementation therefore offers the possibility to control the broadcasting of sensitive data contained in data packets once these have been emitted by the terminal UE (i.e. the terminal UE can no longer have control of these packets now emitted).

As described above, the invention can also cover embodiments in which several intermediate devices belong to the managing system SYS. Also, in such modes, nothing precludes the envisioning of all or part of the profiles associated with these intermediate devices from being separate from one another.

In this embodiment, and as illustrated by FIG. 3, the processing device DT_PAP of the intermediate device PAP includes yet another functional module than those previously described, it being understood that the presence of this other functional module is, within the meaning of this invention, optional.

More specifically, the processing device DT_PAP also includes a learning module MOD_LEARN_PAP configured to execute a learning algorithm to detect at least one recurring data pattern (e.g. persistent identifier(s), number(s), address(es), etc.) contained in a set of data packets emitted by said terminal UE.

Moreover, in this embodiment, said applying module MOD_EXEC_PAP is also configured to execute, if at least one recurring data pattern is detected, an application of a rule for controlling the broadcasting of said at least one detected recurring data pattern. In other words, the profile PROFIL_PAP can contain one or more control rules relying on recurring data patterns thus detected.

The learning algorithm executed by the learning module MOD_LEARN_PAP corresponds for example to an algorithm from the field of artificial intelligence based in particular on machine learning techniques and configured to carry out a semantic analysis of the data packets received. In general, any automatic learning algorithm known to those skilled in the art can be implemented. The learning algorithm can moreover be configured to maintain the persistence period of the detected recurring patterns (1 day, 1 week, permanent) associate a type with such patterns, etc.

The fact of executing said learning algorithm (and therefore considering that the processing device DT_PAP includes said learning module MOD_LEARN_PAP) advantageously makes it possible to enrich (complete) the profile PROFIL_PAP gradually as the data packets are received by the intermediate device PAP. In other words, these dispositions make it possible to implement a search for sensitive data as part of a dynamic process, unlike embodiments in which said profile PROFIL_PAP remains frozen, where the search for sensitive data is part of a static process (i.e. PROFIL_PAP profile remaining frozen).

Note also that it is possible to envision the processing device DT_PAP being configured to recognize recurring data patterns without having awareness of the structure of the data packets it receives.

What is more, when the processing device DT_PAP detects a recurring data pattern corresponding to an address (for example an IP and/or SNI (Server Identification) address), and this address is not yet listed in its profile PROFIL_PAP, it can then start a procedure with the aim of resolving the identity of the entity associated with this address. Such a procedure is known per se, and consists for example in emitting one or more queries to a suitable database (e.g. WHOIS database).

Note that it is considered in this embodiment that said learning algorithm is implemented by the processing device DT_PAP of the intermediate device. However, nothing precludes the envisioning of other embodiments in which said learning algorithm is executed by an entity other than said intermediate device PAP (and also separate from the terminal UE), this entity being able to maintain a profile PROFIL_PAP reflecting the results of said learning algorithm and then transmitted to the processing device DT_PAP of the intermediate device PAP.

As regards the authorization criterion CRIT_AUTH, the latter can take different forms according, in particular, to the context in which the invention is implemented.

Thus, according to an exemplary embodiment, said authorization criterion CRIT_AUTH is representative of a subscription of the user of the terminal UE to a service contract from the access provider FAI responsible for managing the access network NET_ACC. This contract can more specifically concern a paid service offered by said access provider FAI to allow the control of the broadcasting of sensitive data by the processing device DT_PAP. Consequently, in this exemplary embodiment, it is possible for the authorization criterion CRIT_AUTH to not be satisfied if, for example, the user has not subscribed to said paid service, or if the user is late in the payment of a monthly subscription to said paid service, etc.

According to another exemplary embodiment, said authorization criterion CRIT_AUTH is representative of the consent the user of the terminal UE grants the access provider FAI responsible for managing the access network NET_ACC to the controlling of the broadcasting of sensitive data being carried out, this consent of the user being given independently of any subscription to a contract concerning a service such as that forming the subject of the preceding example. In other words, in this exemplary embodiment, the service provided by the access provider FAI is a free service offered to the user of the terminal UE, the latter having simply to grant its consent for this service to be active. Consequently, in this exemplary embodiment, it is possible for the authorization criterion CRIT_AUTH to not be satisfied if, for example, the user of the terminal UE has not granted its consent to the access provider FAI.

It should be noted that the fact of taking into account an authorization criterion CRIT_AUTH (and therefore, ultimately, the taking into account of a verifying module MOD_VERIF_1) is, within the meaning of the invention, optional. This is because nothing precludes the envisioning, for example, of the access provider offering, de facto and free of charge, a service consisting in controlling the broadcasting of sensitive data in data packets, such that by choosing precisely this access supplier FAI, the user of the terminal UE knows that its data packets will undergo analysis.

FIG. 4 represents, in the form of a flowchart, a particular embodiment of a processing method implemented by the sensitive data managing system SYS of FIG. 1.

For the remainder of the description of the mode of FIG. 4, it is considered without any limitation that the user profile PROFIL_UE of the terminal UE, which is stored by the intermediate device PAP (for example in its non-volatile memory 4_PAP) before the implementation of the particular embodiment of FIG. 4, includes a control rule RC1_UE consisting in the deletion of the IMSI number associated with the terminal UE. It is moreover considered that no update of this profile PROFIL_UE is desired by the user of the terminal UE.

It is also considered without any limitation that the profile PROFIL_PAP of the intermediate device PAP is initially (i.e. before the particular implementation of the embodiment of FIG. 4) possessed by the access provider FAI, and that it includes:

- a control rule RC1_PAP consisting in the deletion of an identifier ID_LOC of the local network NET_LOC,
- a control rule RC2_PAP consisting in the deletion of a persistent identifier corresponding to a hardware serial number NUM_HW_UE of the terminal UE,
- a control rule RC3_PAP consisting in the replacement of the current IP address @IP_CUR of the terminal (i.e. the IP address visible in the data packets received from the terminal UE) with another IP address @IP_NEW.

Note that the existence of said control rule RC2_PAP is the result of prior implementations of the processing method, based on which the learning module MOD_LEARN equipping the processing device DT_PAP of the intermediate device PAP has made it possible to identify said hardware serial number NUM_HW_UE as a recurring data pattern.

In this mode of implementation, and as illustrated by FIG. 4, the processing method includes a step E10 of obtaining (receiving), by the intermediate device PAP and coming from the access provider FAI, of the profile PROFIL_PAP. Said step E10 is implemented by the obtaining module MOD_OBT_PAP equipping the processing device DT_PAP of the intermediate device PAP, and follows the transmission (sending) by the access provider FAI of said profile PROFIL_PAP to said intermediate device PAP.

The processing method also includes a step E20 of emitting of a request REQ_UE to obtain the user profile PROFIL_UE. Said request REQ_UE is more specifically emitted to the intermediate device PAP. Said step E20 is implemented by the emitting sub-module SS_MOD_TX_UE equipping the processing device DT_UE of the terminal UE.

In this mode of implementation, the processing method also includes a step E30 of receiving, by the intermediate device PAP, the obtainment request REQ_UE emitted by the terminal UE. Said step E30 is implemented by the first receiving module MOD1_RX_PAP equipping the processing device DT_PAP of the intermediate device PAP.

On receiving said request REQ_UE, the processing device DT_PAP implements a step E40 of transmission to the terminal UE of the user profile PROFIL_UE that it has stored. Said step E40 is implemented by the first emitting module MOD1_TX_PAP equipping the processing device DT_PAP of the intermediate device PAP.

It is here recalled that the fact of envisioning an obtainment, by the terminal UE, of a profile UE via the sending of the request UE constitutes only one variant of implementation of the invention, and that another variant can also be envisioned, in which the profile UE is transmitted by the processing device DT_PAP on its own initiative. It will be understood that in this other variant, the processing method does not include the steps E20 and E30 previously described, and that the step E40 is implemented by the processing device DT_PAP on its own initiative.

Hence, the processing method includes a step E50 of receiving, by the terminal UE and coming from the intermediate device PAP, of the user profile PROFIL_UE. Said step E50 is implemented by the receiving sub-module SS_MOD_RX_UE equipping the processing device DT_UE of the terminal UE.

Once in the possession of the user profile PROFIL_UE, the terminal UE is able to apply the control rules it contains to data packets intended to be transmitted to a destination equipment item EQUIP_OS, EQUIP_APP_i.

For the remainder of the description, and solely for the purposes of simplification thereof, the case of a single data packet PAQ_OS will henceforth be considered. More specifically, said data packet PAQ_OS is generated by the operating system OS of the terminal UE and is intended to be transmitted to the equipment item EQUIP_OS.

It will however be understood that the fact of considering such a single data packet PAQ_OS does not constitute a limitation of the invention. This is because it is possible to envision any number of data packets, but also to envision sensitive data being inserted into these packets by a source other than the operating system OS.

Thus, when the data packet PAQ_OS is generated by the operating system OS, and before it is emitted by the terminal UE, the processing method includes a step E60 of searching for sensitive data associated with the control rule RC1_UE contained in the user profile PROFIL_UE. Said step E60 is implemented by the searching module MOD_ID_UE equipping the processing device DT_UE of the terminal UE.

More particularly, given the nature of the control rule RC1_UE, the sensitive data searched for in the packet PAQ_OS relate to the IMSI number of the terminal UE.

In this mode of implementation, and as illustrated in FIG. 4, it is assumed that the IMSI number is detected in the packet PAQ_OS. Consequently, the processing method includes a step E70 of applying the control RC1_UE to the packet PAQ_OS. Said step E70 is implemented by the applying module MOD_EXEC_UE equipping the processing device DT_UE of the terminal UE.

As a result of this step E70 the contents of the packet PAQ_OS are modified, since the IMSI number is deleted. The packet PAQ_OS thus modified is denoted "PAQ_OS_MODIF1" in the remainder of the description.

Once these modifications have been made, the processing device DT_UE of the terminal UE implements a step E80 of sending of said packet PAQ_OS_MODIF1 to the intermediate device PAP which is located appropriately to receive (and not to intercept) said packet PAQ_OS_MODIF1, and thus analyze its contents. Said step E80 is implemented by the emitting module MOD_TX_UE equipping the processing device DT_UE of the terminal UE.

On receiving the packet PAQ_OS_MODIF1 (step E90 implemented by the second module MOD2_RX_PAP equipping the processing device DT_PAP of the intermediate device PAP), the processing device DT_PAP implements a step E100 of verifying the authorization criterion CRIT_AUTH. Said step E100 is implemented by the verifying module MOD_VERIF_PAP equipping said processing device DT_PAP.

In this mode of implementation, it is assumed that the user of the terminal UE has set up a contract with the access provider FAI, such that the authorization criterion CRIT_AUTH is satisfied.

The processing method then includes a step E110 of searching for sensitive data associated with the control rules RC1_PAP, RC2_PAP and RC3_PAP contained in the profile PROFIL_PAP. Said step E110 is implemented by the searching module MOD_ID_PAP equipping the processing device DT_PAP of the intermediate device PAP.

More specifically, given the nature of said control rules RC1_PAP, RC2_PAP and RC3_PAP, the sensitive data searched for in the packet PAQ_OS_MODIF1 are related to the identifier ID_LOC of the local network NET_LOC, to the hardware serial number NUM_HW_UE of the terminal UE and to the current IP address @IP_CUR.

In this mode of implementation, and as illustrated in FIG. 4, it is supposed that the identifier ID_LOC and the address IP @IP_CUR are detected in the packet PAQ_OS_MODIF1, the hardware serial number NUM_HW_UE meanwhile not being detected. Consequently, the processing method includes a step E120 of applying the control rules RC1_PAP and RC3_PAP to the packet PAQ_OS_MODIF1. Said step E120 is implemented by the applying module MOD_EXEC_PAP equipping the processing device DT_PAP of the intermediate device PAP.

As a result of this step E120 the contents of the packet PAQ_OS_MODIF1 are modified, the identifier ID_LOC being deleted and the current IP address @IP_CUR being replaced with the new IP address @IP_NEW. The packet PAQ_OS_MODIF1 thus modified is denoted "PAQ_OS_MODIF2" in the remainder of the description.

Once these modifications have been carried out, the processing device DT_PAP implements a step E130 of transmitting the packet PAQ_OS_MODIF2 to the destination equipment item EQUIP_OS. Said step E130 is implemented by the second emitting module MOD2_TX_PAP equipping said processing device DT_PAP.

Until now the invention has been described by considering that the sensitive data managing system SYS includes a plurality of processing devices, namely said processing device DT_UE of the terminal UE and said processing device DT_PAP of the intermediate device PAP. Other embodiments can nonetheless be envisioned, in which, for example, only the processing device DT_UE (or only the processing device DT_PAP respectively) implements a mode of the processing method according to the invention.

Another important aspect to be noted is that, within the meaning of the invention, the entity whose items of identification information can be predetermined, via detected sensitive data, is not limited solely to the user of a terminal. This is because, as already mentioned above, nothing precludes the consideration of embodiments of the invention in which several terminals are active (i.e. the intermediate device or devices which can hence control the broadcasting of packets emitted by this plurality of terminals). In this case, the entity in question can for example be an entity in charge of managing said plurality of terminals.

To illustrate this, one may consider, without any limitation, the case of a parent having purchased a smartphone for each of his children. Hence, the user of a smartphone is one of the children to which said smartphone is assigned, said parent constituting the entity in charge of the management of all said smartphones.

It can also be noted that in the embodiment of FIG. 1, the terminal UE "belongs" (directly) to the local network NET_LOC, or else "belongs" (indirectly) to the access network NET_ACC. Consequently, it is possible to consider, within the meaning of this invention, an alternative in which the entity whose items of identification information can be predetermined, via detected sensitive data, is the local network NET_LOC or else the access network NET_ACC.

The invention claimed is:

1. A method comprising:

processing at least one data packet generated by at least one terminal connected to a network, said at least one data packet addressed to a destination equipment item accessible via said network and including at least one sensitive datum comprising at least one item of identification information relating to an identity and/or an environment of an entity to which said at least one terminal belongs inserted into said at least one packet before the at least one packet reaches the destination equipment item, said processing implemented by at least one processing device incorporated into said at least one terminal and separate from said destination equipment item, each processing device executing a set of steps comprising:

obtaining at least one control rule of broadcasting at least one predetermined sensitive datum; and in response to detecting said at least one predetermined sensitive datum in said at least one data packet, applying said at least one control rule to said at least one data packet.

2. The method as claimed in claim 1, wherein the obtaining step executed by said processing device includes receiving said at least one control rule, the set of steps executed by said processing device further including a step of emitting said at least one packet implemented after the applying step in response to detecting said at least one sensitive datum in said at least one data packet.

3. The method as claimed in claim 2, wherein the obtaining step executed by the processing device includes emitting a request to obtain said at least one control rule, and said at least one control rule is received by said at least one terminal in response to said request.

4. The method as claimed in claim 2, wherein the set of steps executed by the processing device include a step of updating said at least one obtained control rule.

5. The method as claimed in claim 1, wherein the sensitive data are inserted into said at least one packet by at least one component selected from the group consisting of:

an operating system equipping said at least one terminal;
a software application installed on said at least one terminal;
an access network to which said at least one terminal is connected, and connected to the network via which said destination equipment item is accessible; and
a local network to which said at least one terminal is connected, and connected to said access network.

6. The method as claimed in claim 1, wherein applying the at least one control rule of broadcasting to the at least one predetermined sensitive datum comprises at least one of:
deleting of all or part of said at least one predetermined sensitive datum;
replacing of all or part of said at least one predetermined sensitive datum with one or more other data;
adding at least one datum to said at least one packet; and
modifying of an order of appearance of said at least one predetermined sensitive datum in said at least one packet.

7. A non-transitory computer readable medium having stored thereon instructions which, when executed by a processor of the at least one processing device, cause the processor to implement the method of claim 1.

8. A processing device for processing at least one data packet generated by at least one terminal connected to a network, said at least one data packet having as a destination a destination equipment item accessible via said network and including at least one sensitive datum comprising at least one item of identification information relating to an identity and/or an environment of an entity to which said at least one terminal belongs inserted into said at least one packet before the at least one data packet reaches said destination equipment item, said processing device incorporated into said at least one terminal, separate from said destination equipment item and including:
at least one processor; and
at least one non-transitory computer readable medium comprising instructions stored thereon which when executed by the at least one processor configure the processing device to:
obtain at least one control rule for controlling broadcasting of at least one predetermined sensitive datum; and
in response to detecting said at least one predetermined sensitive datum in said at least one data packet, apply said at least one control rule to said at least one data packet.

9. A communication terminal including the processing device as claimed in claim 8, said instructions further configuring the processing device to emit said at least one packet after said at least one control rule is applied by the applying module in response to detecting said at least one predetermined sensitive datum in said at least one data packet.

10. A sensitive data managing system comprising:
at least one communication terminal connectable to a network; and
at least one intermediate device, wherein:
the at least one communication terminal comprises a terminal processing device for processing at least one data packet generated by said at least one communication terminal, said at least one data packet addressed to a destination equipment item accessible via said network, said terminal processing device incorporated into said at least one communication terminal and separate from said destination equipment item, and comprising:
at least one processor; and
at least one non-transitory computer readable medium comprising instructions stored thereon which when executed by the at least one processor configure the terminal processing device to:
obtain at least one control rule for controlling broadcasting of at least one predetermined sensitive datum;
in response to detecting said at least one predetermined sensitive datum in said at least one data packet, apply said at least one control rule to said at least one data packet; and
emit said at least one packet after said at least one control rule is applied; and
the at least one intermediate device comprises an intermediate processing device for processing said at least one data packet, said intermediate processing device incorporated into said at least one intermediate device and separate from said destination equipment item, and comprising:
at least one processor; and
at least one non-transitory computer readable medium comprising instructions stored thereon which when executed by the at least one processor configure the intermediate processing device to:
obtain at least one first control rule of broadcasting at least one predetermined sensitive datum;
transmit to said at least one communication terminal at least one second control rule of broadcasting at least one predetermined sensitive datum;
receive said at least one data packet;
apply said first control rule to said at least one data packet in response to detecting said sensitive datum in said at least one data packet; and
relay said at least one data packet to the destination equipment item after said first control rule is applied to said at least one data packet.

11. A method comprising processing at least one data packet generated by at least one terminal connected to a network, said at least one data packet addressed to a destination equipment item accessible via said network and including at least one sensitive datum comprising at least one item of identification information relating to an identity and/or an environment of an entity to which said at least one terminal belongs inserted into said at least one packet before the at least one packet reaches the destination equipment item, said processing implemented by at least one processing device incorporated into at least one device separate from said at least one terminal and referred to as an "intermediate device", each processing device executing a set of steps comprising:
obtaining at least one first control rule of broadcasting at least one predetermined sensitive datum;
transmitting to said at least one terminal at least one second control rule of broadcasting at least one predetermined sensitive datum; and
applying said first control rule to said at least one data packet in response detecting the least one predetermined sensitive datum in said at least one data packet.

12. The method as claimed in claim 11, wherein the at least one sensitive datum are inserted into said at least one packet by at least one component selected from the group consisting of:
an operating system equipping said at least one terminal;
a software application installed on said at least one terminal;

an access network to which said at least one terminal is connected, and connected to the network via which said destination equipment item is accessible; and a local network connected to said at least one terminal and said access network.

13. The method as claimed in claim 11, wherein applying said first control rule comprises at least one of:

deleting of all or part of said at least one predetermined sensitive datum;

replacing of all or part of said at least one predetermined sensitive datum with one or more other data;

adding at least one datum to said at least one packet; and modifying of an order of appearance of said at least one predetermined sensitive datum in said at least one packet.

14. A non-transitory computer readable medium having stored thereon instructions which, when executed by a processor of the at least one processing device, cause the processor to implement the method of claim 11.

15. A processing device for processing at least one data packet generated by at least one terminal connected to a network, said at least one data packet addressed to a destination equipment item accessible via said network and including at least one sensitive datum comprising at least one item of identification information relating to an identity and/or an environment of an entity to which said at least one terminal belongs inserted into said at least one packet before the at least one packet reaches the destination equipment item, said processing device incorporated into at least one device, separate from said at least one terminal and referred to as an "intermediate device", the processing device configured to execute a set of steps comprising:

obtaining at least one first control rule of broadcasting at least one predetermined sensitive datum;

transmitting to said at least one terminal at least one second control rule of broadcasting at least one predetermined sensitive datum;

receiving said at least one data packet; and in response to detecting said at least one predetermined sensitive datum in said at least one data packet, applying said first control rule to said at least one data packet.

16. The method as claimed in claim 11, wherein said set of steps executed by said processing device further including:

receiving said at least one data packet; and after the applying step relaying said at least one data packet to the destination equipment item.

17. The method as claimed in claim 16, wherein: said set of steps executed by said processing device include:

receiving an obtainment request emitted by said at least one terminal; and transmitting the at least one second control rule to said at least one terminal in response to receiving the obtainment request.

18. The method as claimed in claim 11, wherein said at least one second control rule is addressed to said at least one terminal by said processing device incorporated into said intermediate device, on said processing device's own initiative.

19. The method as claimed in claim 11, said method further including a step of implementing, by the processing device incorporated into said intermediate device and comprising executing a learning algorithm to detect at least one recurring data pattern contained in a set of data packets emitted by said at least one terminal, said applying step executed by said processing device further including, in response to detecting at least one recurring data pattern, applying a first rule for controlling the broadcasting of said at least one detected recurring data pattern.

20. The method as claimed in claim 11, wherein said set of steps executed by the processing device incorporated into said intermediate device further includes a step of searching for said at least one sensitive datum associated with said at least one first control rule in said at least one data packet, said searching step implemented by said processing device in response to satisfying a criterion of authorization to search for sensitive data for said at least one terminal.

21. The intermediate device including the processing device as claimed in claim 15, wherein the set of steps includes relaying said at least one data packet to the destination equipment item after said first control rule is applied.

22. The intermediate device as claimed in claim 21, wherein said intermediate device is located on a route for routing said at least one data packet toward said destination equipment item or is connected to the terminal by a tunnel.

23. The intermediate device as claimed in claim 21, wherein said intermediate device is deployed in:

the network via which said destination equipment item is accessible;

an access network connected to the network via which said destination equipment item is accessible; or a local network to which said at least one terminal is connected, and connected to said access network.

* * * * *